United States Patent [19]
Akieda

[11] Patent Number: 5,907,451
[45] Date of Patent: May 25, 1999

[54] SUPPORT BEARING FOR A PIVOT SHAFT OF A CASSETTE LOADER

[75] Inventor: Masayuki Akieda, Moriguchi, Japan

[73] Assignee: Matsushita Electric Industrial Co., Ltd., Japan

[21] Appl. No.: 08/938,352

[22] Filed: Sep. 29, 1997

[30] Foreign Application Priority Data

Sep. 30, 1996 [JP] Japan ................................ 8-257922

[51] Int. Cl.$^6$ .................................................. G11B 5/008
[52] U.S. Cl. ........................................................ 360/96.5
[58] Field of Search .............................. 360/96.5, 85, 95

[56] References Cited

U.S. PATENT DOCUMENTS

| | | | |
|---|---|---|---|
| 5,754,363 | 5/1998 | Asakura | 360/96.5 |
| 5,781,370 | 7/1998 | Choi | 360/96.5 |
| 5,781,371 | 7/1998 | Shibata | 360/96.5 |

*Primary Examiner*—A. J. Heinz
*Attorney, Agent, or Firm*—Parkhurst & Wendel

[57] ABSTRACT

A magnetic recording and reproducing device according to the present invention is designed such that when a holding, moving and driving unit is pivoted for recording or reproducing operation which is of frequent occurrence, a pivot shaft of metal which drives for rotation the holding, moving and driving unit is rotated by being supported by and in friction contact with a bearing which is formed of a portion of a base of metal for the sake of driving for pivotal movement, thereby reducing changes with time to members which changes are produced by forces on the pivot shaft which forces, in turn, are caused by reaction forces from the cassette.

5 Claims, 5 Drawing Sheets

SUPPORT BEARING FOR A PIVOT SHAFT OF A CASSETTE LOADER

FIELD OF THE INVENTION

The present invention relates to a magnetic recording and reproducing device of the type in which a cassette containing a recording medium for magnetically recording information thereon is moved to a predetermined position where it is loaded, the recording medium in said cassette being driven at least when information is to be recorded or reproduced.

BACKGROUND OF THE INVENTION

A videotape recorder (hereinafter referred to as VTR) which has heretofore been used in homes as a magnetic recording and reproducing device for recording and reproducing images is, in use, loaded with a videotape cassette (hereinafter referred to simply as cassette) to record or reproduce images such as television programs. As for cassette loading systems, almost all VTR's have recently employed the front loading system.

In such conventional VTR, an outline will now be given of the cassette loader for loading a cassette in the recording and reproducing position so as to record or reproduce information or images such as television programs.

FIG. 3 is a schematic structural view showing the vicinity of the cassette loader of a VTR which is a conventional magnetic recording and reproducing device. As shown in FIG. 3, the cassette loader 1 comprises a cassette holder 6 which is disposed inwardly of a cassette insertion port 3 formed in a front panel 2 and which, while holding on a mechanism base of metal 4 a cassette 5 containing a recording medium for recording visual information and acoustic information thereon, moves the cassette to a recording and reproducing position where recording and reproducing is allowed, and a holding, moving and driving unit 9 adapted to be pivoted around the axis J1 of a pivot shaft 7 to thereby drive the cassette holder 6 such that the cassette holder 6 moves in the direction of arrow Y1 through engaging portion 8 which engages a projection 6a formed on the cassette holder 6, the arrangement being such that the movement of the cassette holder 6 in the direction of arrow Y1 results in loading the cassette 5 in the recording and reproducing position.

In the above arrangement, the holding, moving and driving unit 9 is engaged with a drive transmission bar 12 through a gear 10 formed on the axis j1, said drive transmission bar 12 being formed with an arcuate rack 11 which meshes with said gear 10, said drive transmission bar 12 being driven by a motor in the direction of arrow y2 to drive the gear 10 for rotation, thereby pivoting the holding, moving and driving unit 9 around the axis J1 of the pivot shaft 7.

In this case, the pivot shaft 7 around whose axis j1 the holding, moving and driving unit 9 is pivoted is directly supported by bearings 15 and 16 formed as holes in lateral plates 13 and 14 attached to the opposite sides of the mechanism base 4, said lateral plates 13 and 14 being provided in recent years in the form of resin moldings for the sake of reducing the weight and cost of the device.

Referring to the cassette loader 6 constructed in the manner described above, its operation will now be described. The outline of the operation of the cassette loader 1 to be given herein extends from the initial state prior to cassette loading to the cassette loading completion state, i.e., the final phase in which a cassette 5 has been loaded in the recording and reproducing position.

FIG. 4 shows a state prior to the loading of a cassette by the cassette loader 1 and FIG. 5 shows a cassette loading completion state.

As shown in FIG. 4, when the cassette 5 is loaded in the cassette holder 6 as shown by an arrow Y3, this loaded state is detected to rotate a motor (not shown), whereby the drive transmission bar 12 is slid in the direction of arrow Y4. This slide movement of the drive transmission bar 12 effects the rotation of the gear 10 of the holding, moving and driving unit 9 meshing with the arcuate rack 11 of the drive transmission bar 12 and concurrently therewith the holding, moving and driving unit 9 is pivoted around the axis j1 of the pivot shaft 7 in the direction of arrow Y5.

As a result of this pivotal movement of the holding, moving and driving unit 9, the cassette holder 6, with the cassette 5 held therein, is moved in the direction of arrow Y6 while sliding the projections 6a and 6b along guide grooves 13a and 13b formed in the lateral plate 13, because the projection 6a is engaged with the engaging portion 8 of the holding, moving and driving unit 9.

Further, as shown in FIG. 5, when the drive transmission bar 12 is slid in the direction of arrow Y7, the holding, moving and driving unit 9 is further pivoted in the direction of the direction of arrow Y8, and the cassette holder 6 is moved in the direction of arrow Y9 while further sliding the projections 6a and 6b engaging the engaging portion 8 of the holding, moving and driving unit 9 along the guide grooves 13a and 13b.

In this manner, the cassette holder 6 comes to be disposed in the recording and reproducing position, and hence the cassette held in this cassette holder 6 is loaded in the recording and reproducing position, so that the magnetic tape which is a recording medium held in the cassette is ready to record or reproduce visual and acoustic information contained in television programs.

In addition, as shown in FIG. 5, cassette pressers 20 are installed on both sides of the cassette holder 6 to press the upper surface of the cassette 5 held therein so as to prevent the cassette 5 from slipping off, and a spring member 20a having an elastic force is attached to the region of each cassette presser 20 which abuts against the cassette.

Further, as shown in FIG. 5, the holding, moving and driving unit 9 has projection pressing springs 21 attached thereto 21 for pressing the projections 6a to prevent the latter from rattling.

This known type of magnetic recording and reproducing device has the following drawback.

In the conventional examples shown in FIGS. 3 through 5, when the cassette holder with a cassette 5 held therein is moved to the recording and reproducing position where the cassette 5 is loaded for recording or reproducing purposes, pressing forces exerted by the cassette pressers 20 act on the cassette 5 through the spring members 20a in the direction of arrow Y9.

Owing to these pressing forces, reversely, reaction forces exerted by the cassette 5 act on the cassette pressers 20 through the spring members 20a in the direction of arrow Y10, and concurrently with these reaction forces there occur reaction forces exerted by the projections 6a of the cassette holder 6 to which the cassette pressers 20 is attached which reaction forces act on the projection pressing springs 21 in the direction of arrow Y11, these reaction forces being followed by forces exerted by the pivot shaft 7 which act on the bearing portions 15 and 16 of the lateral plates 13 and 14 in the direction of arrow Y12.

If, therefore, the situation in which the cassette 5 is held in its loaded state in the recording and reproducing position for a long time occurs frequently, this leads to the result that the portions of the inner surfaces of the bearing portions 15 and 16 of the lateral plates 13 and 14 of resin which are acted on by the forces in the direction of arrow Y12 are deformed in the direction of arrow Y12. That is, the lateral plates 13 and 14 including the bearing portions 15 and 16 are deformed in the direction of arrow Y12 and the engaging portion 8 of the holding, moving and driving unit 9 is moved in the direction of arrow Y11 and so the cassette holder 6 is moved also in the direction of arrow Y11. Therefore, the reel (not shown) of the cassette 5 placed in the cassette holder 6 is disengaged from reel blocks R1, so that the driving forces exerted by the reel blocks R1 are not fully transmitted to the reel of the cassette 5, thus detracting from the reliability of the device itself.

SUMMARY OF THE INVENTION

The object of the present invention, which has been accomplished with the above drawback in mind, provides a magnetic recording and reproducing device wherein forces on a pivot shaft connected to a holding, moving and driving unit due to reaction forces from a cassette loaded in a recording medium driving position (i.e., recording and reproducing position) are used to eliminate changes that occur over time to lateral plates which occur in the conventional arrangement, thus improving the reliability of the cassette loader and the device itself.

To achieve this object, a magnetic recording and reproducing device described in claim 1 of the present invention comprises a cassette holder 6 which, while holding on a base of metal a cassette 5 containing a recording medium for magnetically recording information, moves said cassette to a recording medium driving position where said recording medium can be driven, and a holding, moving and driving unit which is pivotable around the axis of a pivot shaft to thereby effect said movement of said cassette holder, said movement of the cassette holder serving to load the cassette in said recording medium driving position, said magnetic recording and reproducing device being characterized in that a bearing for supporting the pivot shaft of said holding, moving and driving unit is formed of a portion of said base.

In an embodiment, a magnetic recording and reproducing device is characterized in that the bearing for the holding, moving and driving unit is formed by cutting up a portion of said base and then bending the front end thereof to support the pivot shaft.

According to such a device, during the pivotal movement of the holding, moving and driving unit which is frequently effected for recording or reproducing, the pivot shaft of metal which pivots the holding, moving and driving unit is allowed to rotate while it is supported by and in friction contact with the inner surfaces of the bearings formed of portions of the base of metal.

According to a preferred embodiment of the invention, even if the situation in which a cassette is held in its loaded state in the recording and reproducing position for many hours is of frequent occurrence, the pivot shaft of metal which pivots the holding, moving and driving unit is allowed to rotate while it is supported by and in friction contact with the inner surfaces of the bearings which are formed of portions of the base of metal to allow for pivotal movement.

Therefore, forces which act on the pivot shaft connected to the holding, moving and driving unit and which are exerted by reaction forces from the cassette loaded in the position where the recording medium can be driven, greatly reduce changes with time to members which occur in the prior art arrangement, and hence improve the reliability of the device itself.

DESCRIPTION OF THE PREFERRED EMBODIMENT

Figure 1:
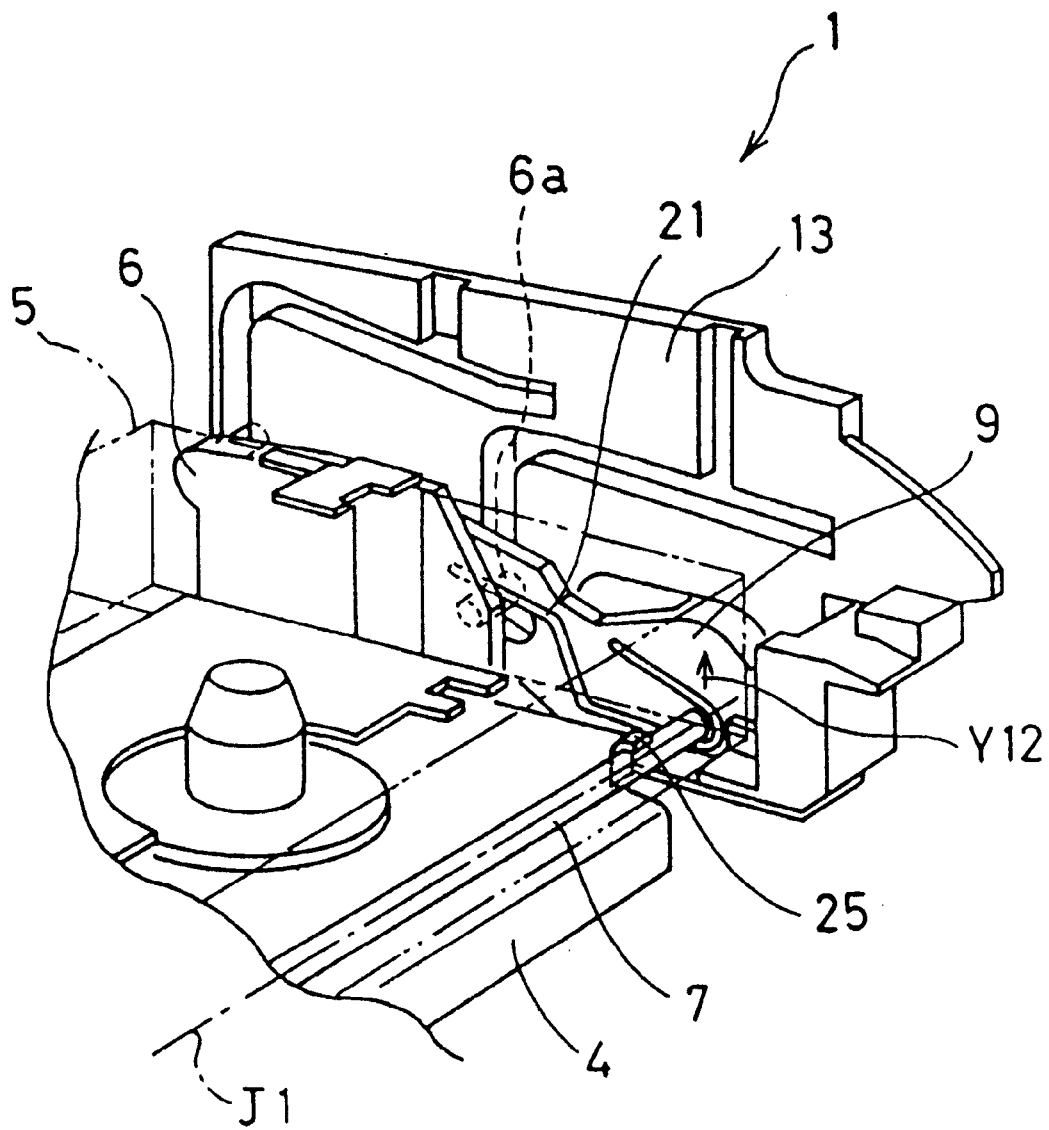
FIG. 1 is a principal structural view of a VTR which is a magnetic recording and reproducing device according to the invention.
Figure 2:
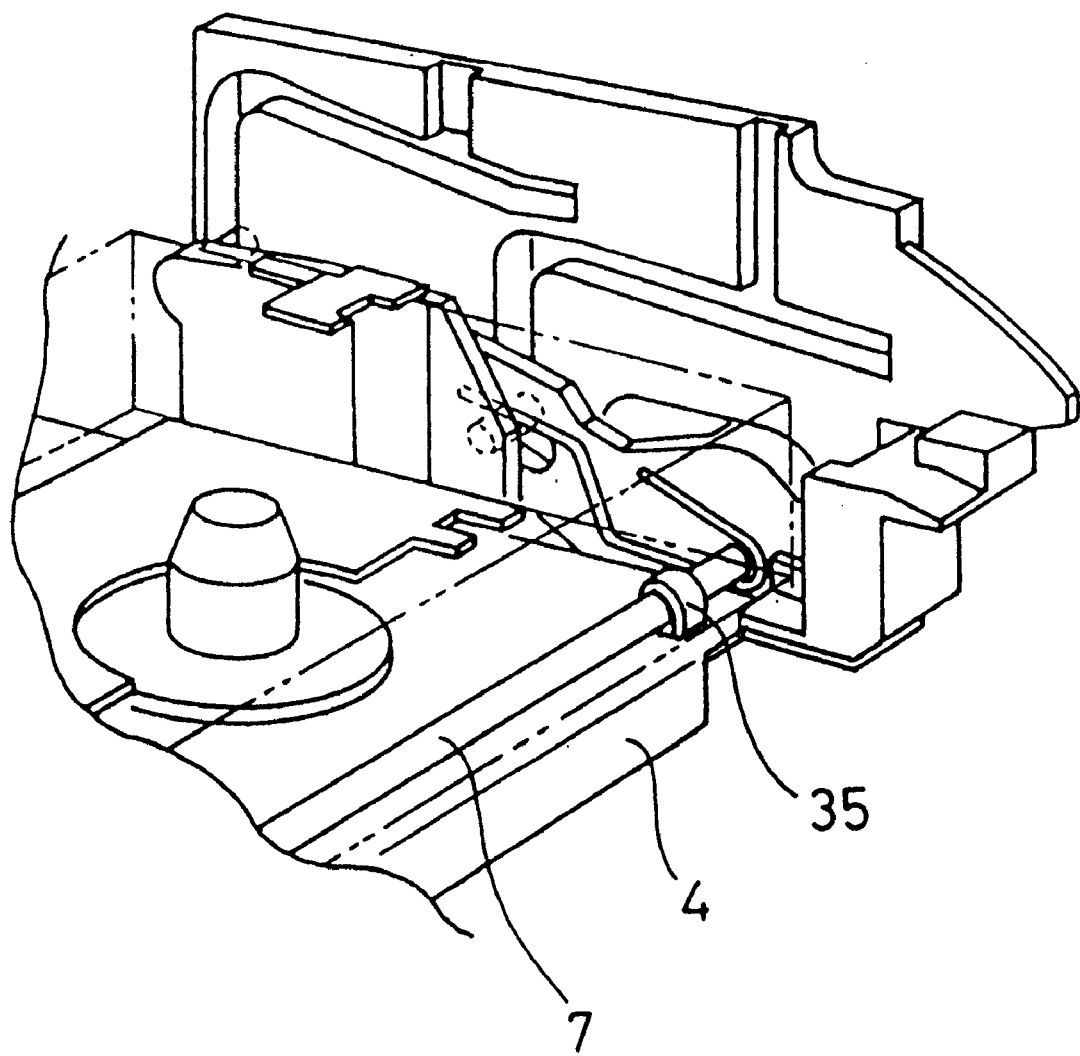
FIG. 2 is a principal structural view of a VTR which is another magnetic recording and reproducing device according to the invention.

Preferred embodiments of the invention are shown in FIGS. 1 and 2.

FIG. 1 is a structural view of the principal portion of a VTR which is a magnetic recording and reproducing device according to the invention, showing a cassette loaded in a recording and reproducing position, i.e., completed state of cassette loading.

The entire arrangement of the cassette loader 1 shown in FIG. 1 as a principal structural view of a VTR is basically the same as the conventional example described with reference to FIG. 3. That is, the arrangement comprises a cassette holder 6 which, while holding on a base 4 of metal constructed to serve as the base of the cassette loader 1 a cassette 5 (shown in phantom lines for the sake of clarifying the mechanism) containing a recording medium, e.g., in tape form, for magnetically recording information, moves said cassette to a recording medium driving position (in this case, a recording and reproducing position) where said recording medium can be driven, and a holding, moving and driving unit 9 which is pivotable around the axis J1 of a pivot shaft 7 to thereby effect said movement of said cassette holder 6 to the recording and reproducing position, said movement of the cassette holder 6 to said recording and reproducing position serving to load the cassette 5 in said recording and reproducing position.

In this VTR, a bearing 25 formed by cutting up a portion of a base 4 supports the pivot shaft 7 of the holding, moving and driving unit 9.

Further, in the above arrangement, the bearing 25 may be formed by cutting up a portion of the base 4 and then bending the front end of the cut-up portion so as to support the pivot shaft 7. In this case, the bearing 25 can be easily formed by inserting the pivot shaft 7 from above the base 4 with a portion of the base 4 cut up, and then bending the front end thereof; this facilitates the assembling operation.

As regards cut-up shapes, an inverted J-shape shown in FIG. 1 or an inverted L-shape or any other shape adapted to receive the pivot shaft 7 may be used with the same merits.

In addition, in the cassette loader 1 in the VTR of said embodiment, the bearing has been formed using a necessary minimum member which is required at least to resist only the force in the direction of arrow Y12 from the pivot shaft 7 and which is required in fabrication without offering problems in fabrication, such as one about assembling of the pivot shaft. However, as shown in FIG. 2, the base 4 and bearing 35 may be wrapped around the pivot shaft 7; thus, the bearing may be made in any shape using any production method which causes no trouble in the assembling operation.

Figure 3:
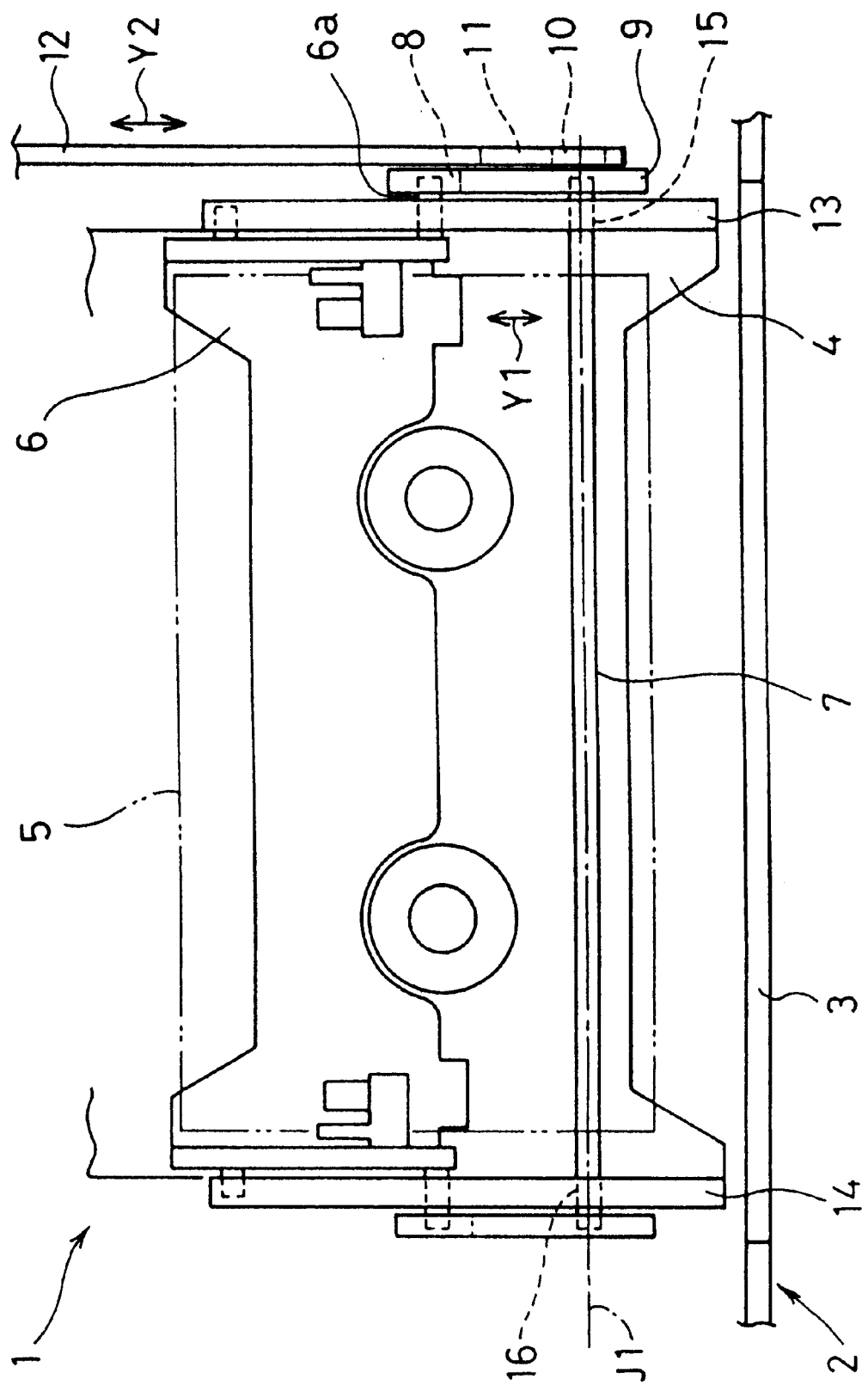
FIG. 3 is a structural view of a cassette loader in a conventional VTR.
Figure 4:
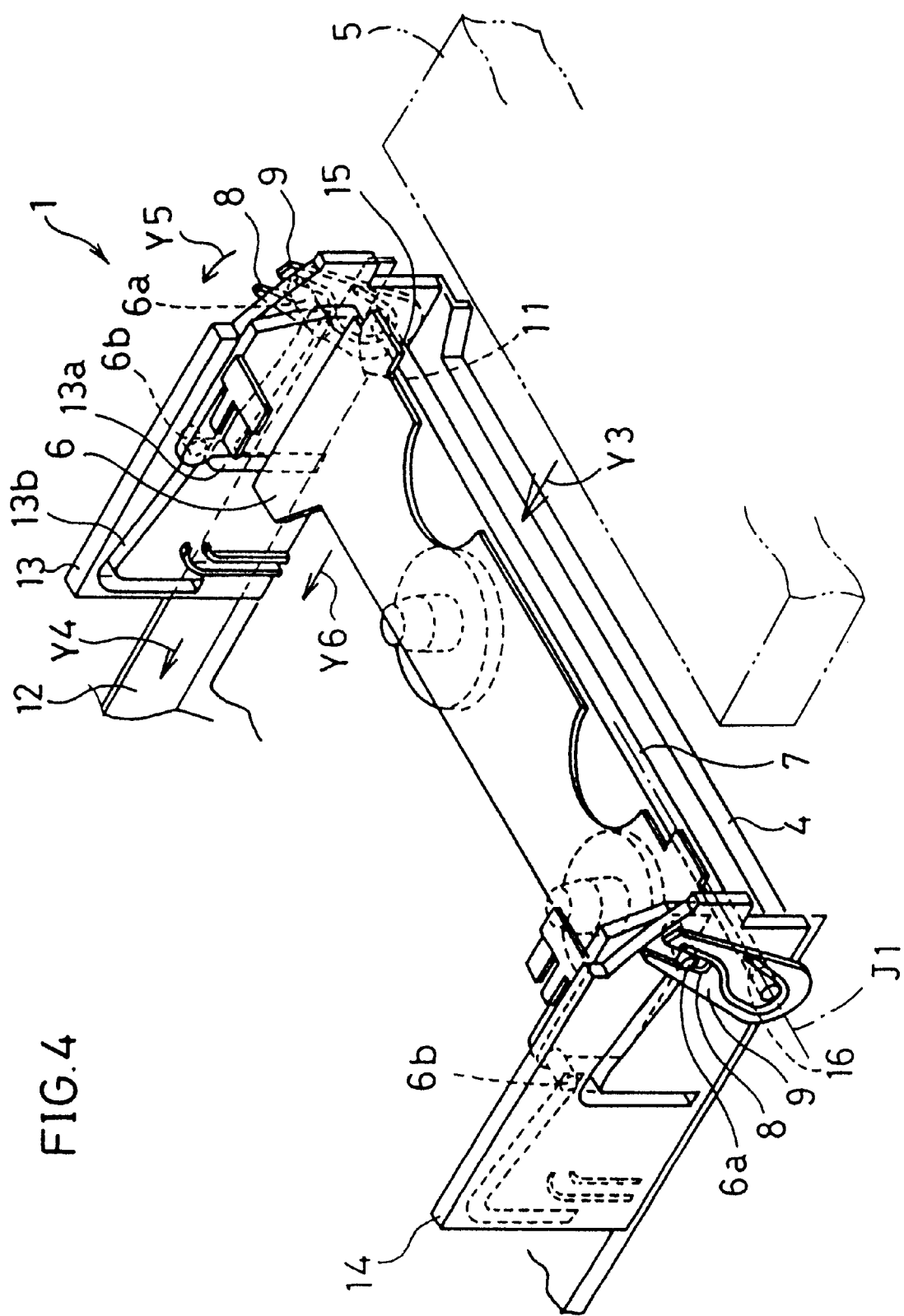
FIG. 4 is an explanatory view showing a state prior to loading a cassette in said conventional example.
Figure 5:
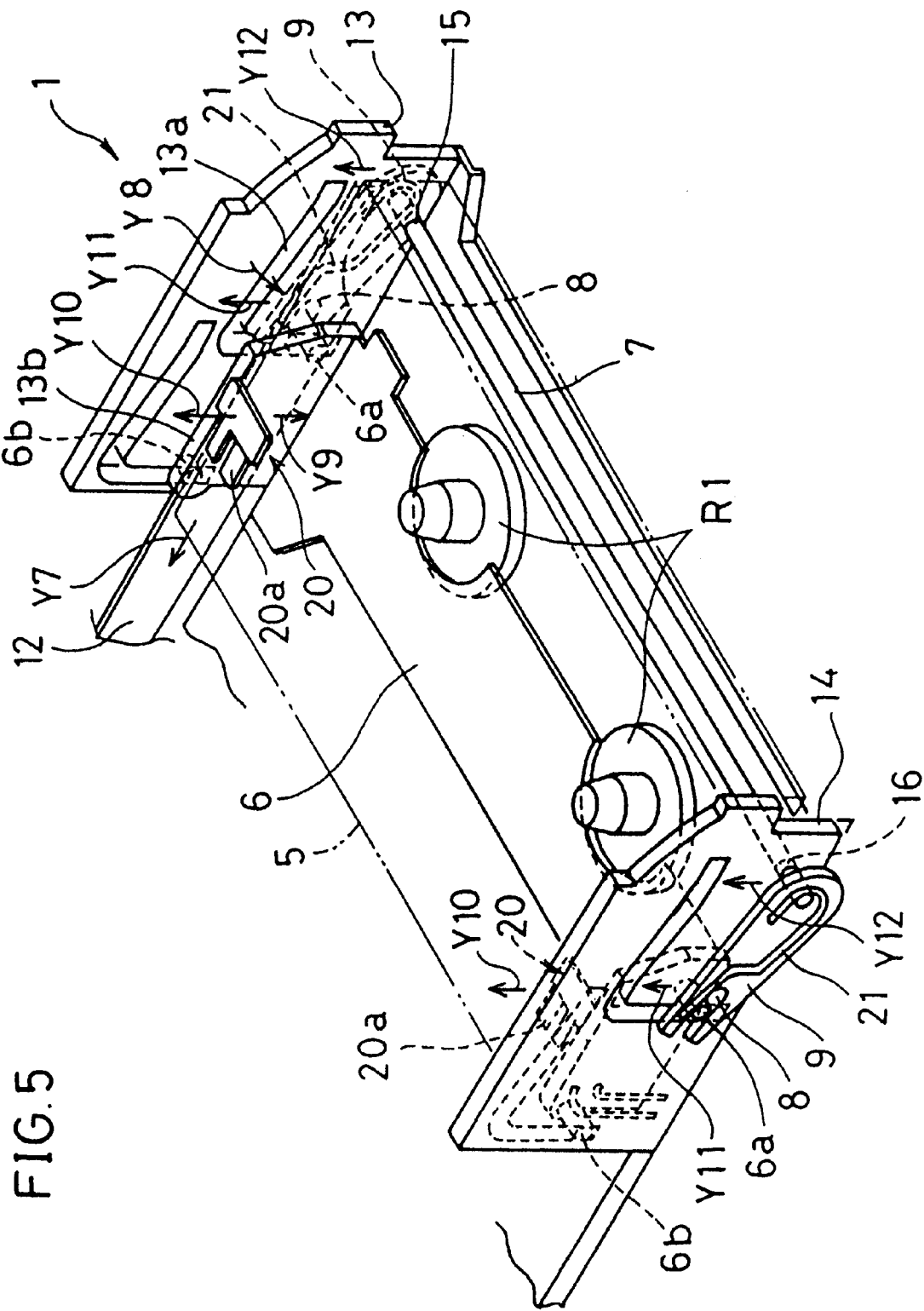
FIG. 5 is an explanatory view showing a state after the completion of loading a cassette in said conventional example.

Further, in the cassette holder 1 in the VTR of said embodiment, the description has been given of the holding, moving and driving unit 9 with reference to an example in which it is installed between the cassette holder 6 and the lateral plate 13; however, the holding, moving and driving unit 9, the cassette holder 6 and the lateral plate 13 may be arranged to assume the same positional relationship as in the conventional example shown in FIGS. 3 through 5, and yet the same merits can be obtained.

What is claimed is:

1. In a magnetic recording and reproducing device comprising a cassette holder movably disposed on a metal base between a cassette insertion point and a recorded medium driving position, wherein a cassette, located in the cassette holder, containing a recording medium for magnetically recording information is moved from the cassette insertion point to the recorded medium driving position by a holding, moving and driving unit pivotable around an axis of a pivot shaft located above the base, the improvement comprising:

a support bearing supporting said pivot shaft of said holding, moving and driving unit that is formed of a portion of said bass.

2. The magnetic recording and reproducing device according to claim 1, wherein said support bearing supporting said pivot shaft is formed by cutting a portion of said base and then bending said portion towards a front of said pivot shaft.

3. The magnetic recording and reproducing device according to claim 2, wherein said support bearing supporting said pivot shaft is bent into a circle.

4. The magnetic recording and reproducing device according to claim 2, wherein said support bearing supporting said pivot shaft is J-shaped.

5. The magnetic recording and reproducing device according to claim 2, wherein said support bearing supporting said pivot is L-shaped.

* * * * *